United States Patent
Tanaka

(10) Patent No.: US 10,596,499 B2
(45) Date of Patent: Mar. 24, 2020

(54) PRE-AIR-FILTER FOR INTERNAL COMBUSTION ENGINE

(71) Applicant: KUREHA LTD., Shiga (JP)

(72) Inventor: Kazumitsu Tanaka, Shiga (JP)

(73) Assignee: KUREHA LTD., Shiga (JP)

( * ) Notice: Subject to any disclaimer, the term of this patent is extended or adjusted under 35 U.S.C. 154(b) by 0 days.

(21) Appl. No.: 15/551,181

(22) PCT Filed: Feb. 17, 2016

(86) PCT No.: PCT/JP2016/054541
§ 371 (c)(1),
(2) Date: Aug. 15, 2017

(87) PCT Pub. No.: WO2016/136549
PCT Pub. Date: Sep. 1, 2016

(65) Prior Publication Data
US 2018/0028953 A1    Feb. 1, 2018

(30) Foreign Application Priority Data
Feb. 24, 2015   (JP) ................. 2015-034054

(51) Int. Cl.
*F02B 77/04*      (2006.01)
*B01D 39/16*      (2006.01)
(Continued)

(52) U.S. Cl.
CPC .......... *B01D 39/16* (2013.01); *B01D 39/163* (2013.01); *B01D 46/00* (2013.01);
(Continued)

(58) Field of Classification Search
CPC ............... B32B 5/26; B32B 2260/021; B32B 2262/0253; B32B 2253/0276;
(Continued)

(56) References Cited

U.S. PATENT DOCUMENTS 3,748,836 A * 7/1973 Bachle ............... B01D 46/0023
                                                        251/61.1
5,368,925 A * 11/1994 Hosokawa ............... D04H 1/00
                                                        428/373
(Continued)

FOREIGN PATENT DOCUMENTS

JP    10-85526     4/1998
JP    10-180023    7/1998
(Continued)

OTHER PUBLICATIONS

International Search Report dated May 17, 2016 in International Application No. PCT/JP2016/054541.
(Continued)

*Primary Examiner* — Long T Tran
*Assistant Examiner* — James J Kim
(74) *Attorney, Agent, or Firm* — Wenderoth, Lind & Ponack, L.L.P.

(57) ABSTRACT

It is provided that a pre-air-filter, for an internal combustion engine, which allows stiffness to be assured even when the weight is reduced, which also has excellent dust holding properties, and which has an excellent resistance to entry of water. A pre-air-filter for an internal combustion engine (1) contains a nonwoven fabric comprising a first fiber having a melting point of not lower than 80° C. and not higher than 200° C., a second fiber having a melting point of higher than the melting point of the first fiber by not less than 30° C., being crimped, and having a hollow structure, entanglement of the first fiber and the second fiber by needle punching, and fusion of partly or entirely melted first fiber and the second fiber. This pre-air-filter (1) is installed at an air-inlet-side of a main-air-filter (2).

13 Claims, 2 Drawing Sheets

(51) Int. Cl.
*D04H 1/4391* (2012.01)
*D04H 1/485* (2012.01)
*D04H 1/542* (2012.01)
*F02M 35/024* (2006.01)
*F02M 35/02* (2006.01)
*B01D 46/00* (2006.01)
*B01D 46/12* (2006.01)
*B01D 46/10* (2006.01)

(52) U.S. Cl.
CPC ......... *B01D 46/0023* (2013.01); *B01D 46/10* (2013.01); *B01D 46/12* (2013.01); *D04H 1/4391* (2013.01); *D04H 1/485* (2013.01); *D04H 1/542* (2013.01); *F02M 35/024* (2013.01); *F02M 35/0216* (2013.01); *F02M 35/02458* (2013.01); *B01D 2239/064* (2013.01); *B01D 2239/0659* (2013.01); *B01D 2239/1225* (2013.01)

(58) Field of Classification Search
CPC ..... B32B 2262/101; B32B 5/022; B32B 5/06; B01D 2279/60; F02M 35/0216
USPC ....... 123/198 E; 428/131, 364; 442/359, 402
See application file for complete search history.

(56) References Cited

U.S. PATENT DOCUMENTS

| | | | | |
|---|---|---|---|---|
| 6,479,143 | B1* | 11/2002 | Tamaru | D01F 6/12 428/364 |
| 2006/0286343 | A1* | 12/2006 | Curro | A61F 13/00 428/131 |
| 2008/0070465 | A1* | 3/2008 | Wiles | B32B 5/26 442/352 |
| 2008/0081182 | A1* | 4/2008 | Nam | C08F 214/262 428/336 |
| 2008/0288392 | A1* | 11/2008 | Sgaraglio | G06Q 20/027 705/38 |
| 2009/0123203 | A1* | 5/2009 | Tanaka | G03G 15/2057 399/330 |
| 2010/0018174 | A1* | 1/2010 | Komatsu | B01D 46/0005 55/480 |
| 2010/0310845 | A1* | 12/2010 | Bond | A61F 13/5376 428/219 |
| 2011/0247838 | A1* | 10/2011 | Endle | A62C 2/06 169/45 |
| 2011/0300664 | A1* | 12/2011 | Chung | H01L 31/02013 438/80 |
| 2012/0237718 | A1* | 9/2012 | Weisman | A61F 13/15707 428/89 |
| 2015/0252156 | A1* | 9/2015 | Kouketsu | B29C 47/0021 526/253 |
| 2017/0298581 | A1* | 10/2017 | Lewit | E01D 19/125 |

FOREIGN PATENT DOCUMENTS

| | | |
|---|---|---|
| JP | 11-200139 | 7/1999 |
| JP | 11-222756 | 8/1999 |
| JP | 2010-131892 | 6/2010 |
| JP | 2012-81389 | 4/2012 |

OTHER PUBLICATIONS

Chinese Office Action dated Nov. 2, 2018 in corresponding Chinese Patent Application No. 201680011475.8 with English translation.
Notification of Reasons for Rejection dated Sep. 5, 2018 in Japanese Application No. 2015-034054, with English Translation.
Office Action dated Jul. 12, 2019 in corresponding Chinese Patent Application No. 201680011475.8, with English translation.

* cited by examiner

[FIG. 1]
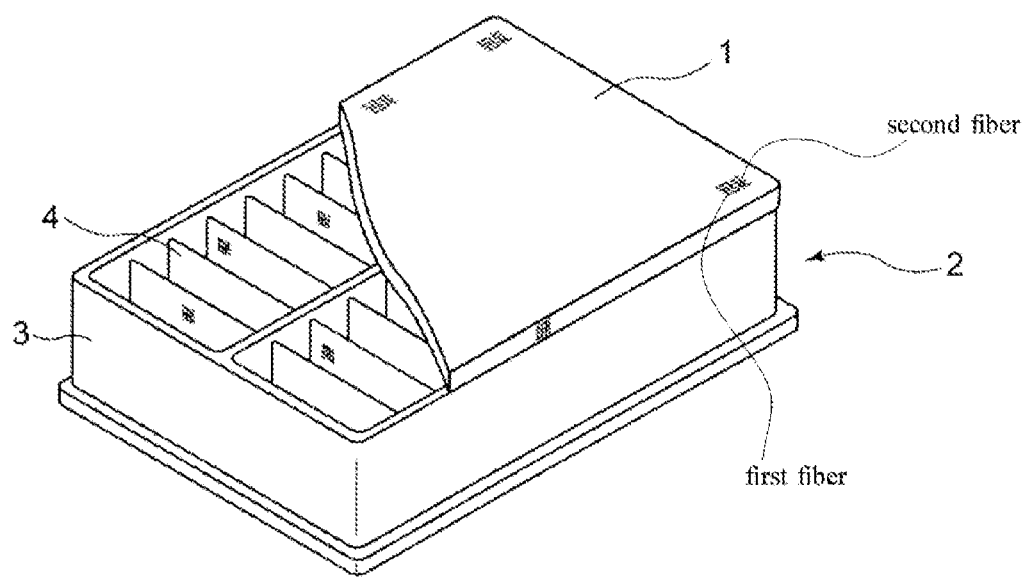

[FIG. 2]
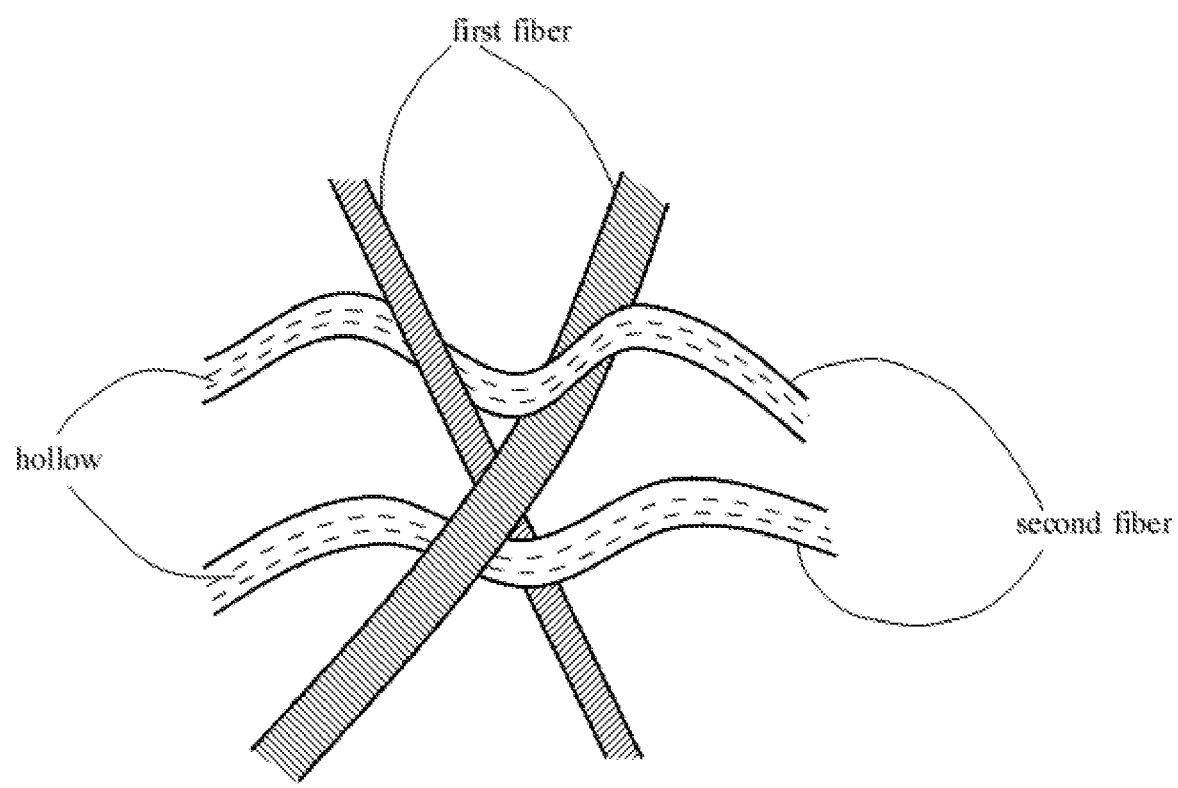

PRE-AIR-FILTER FOR INTERNAL COMBUSTION ENGINE

TECHNICAL FIELD

The present invention relates to a useful pre-air-filter that is formed from a nonwoven fabric and is installed on an air-inlet-side of a main-air-filter in order to enhance collection efficiency of an air cleaner used in an intake line of an internal combustion engine and an amount of dust collected by the air cleaner.

BACKGROUND ART

To date, a nonwoven fabric material or filter paper material has been used for an air filter of an automobile engine, and these materials are pleated to increase a filter medium area in a unit volume, thereby obtaining a predetermined dust holding capacity. For example, in a case where a nonwoven fabric material is used, although the number of pleats is small, the thickness of a filter medium is increased, and deep filtration can be thus performed, thereby obtaining a predetermined dust holding capacity. Meanwhile, in a case where a filter paper material is used, the number of pleats is increased and a filter medium area is thus sufficiently increased, thereby obtaining a predetermined dust holding capacity. In order to further increase the dust holding capacity, a pre-air-filter formed from a nonwoven fabric may be provided upstream of such an air filter (main filter).

More specifically, an air filter for an engine is required to have properties such as reduced pressure loss, enhanced dust cleaning efficiency, and increased dust holding capacity. In particular, in recent years, enhanced dust cleaning efficiency is highly required. In order to achieve enhanced dust cleaning efficiency, it is effective to form a fine mesh of the filter material. However, a drawback in that clogging is accelerated may occur. To date, a pre-air-filter for obtaining a dust holding capacity has been accompanyingly provided preceding a main-air-filter for an engine in order to reduce the clogging and reduce filter replacement frequency. If the pre-air-filter is clogged soon, an intended purpose of reducing the filter replacement frequency cannot be achieved. Therefore, the pre-air-filter is designed so as to have a coarse mesh. Further, the pre-air-filter is designed to be thick in order to increase the dust holding capacity. Further, such a pre-air-filter needs to be designed to be formed from such a material that the pre-air-filter is prevented from being deformed in the thickness direction under a load due to dust and becoming thin, and pressure loss of the pre-air filter is less likely to occur. To date, as such a pre-air-filter, a resin bond type short-fiber nonwoven fabric obtained by bonding fiber webs by a sprayed resin binder has been used because the thickness is likely to be assured (for example, Patent Literature 1).

CITATION LIST

Patent Literature

[PTL 1] Japanese Laid-Open Patent Publication No. H10-85526

SUMMARY OF THE INVENTION

Problems to be Solved by the Invention

However, in a case where the resin bond type nonwoven fabric is used, a large amount of resin needs to be adhered to the nonwoven fabric in order to assure a predetermined stiffness, and it is thus difficult to reduce the weight. Further, in a case where an amount of adhered resin is increased, a dust holding capacity is reduced and, further, pressure loss is increased.

Moreover, water may enter an intake line of an engine, depending on an environment in which an automobile runs. A property (resistance to entry of water) that, while entering water is retained and water is inhibited from leaking to the main filter, increase of pressure loss can be prevented even when the water is retained, are desired to be also excellent.

The present invention is made in view of the aforementioned circumstances, and an object of the present invention is to provide a pre-air-filter, for an internal combustion engine, which allows stiffness to be assured even when the weight is reduced, which also has excellent dust holding properties, and which has an excellent resistance to entry of water.

Solution to the Problems

The inventor of the present invention has found, as a result of intensive studies, that entanglement of a hollow crimped fiber which is crimped and has a hollow structure, and a low melting point fiber is performed by needle-punching, and thermal fusion thereof is thereafter performed without performing resin bonding for a nonwoven fabric, so that (i) when the low melting point fiber is oriented in a thickness direction, an orientation degree in the thickness direction is enhanced in conjunction with the hollow crimped fiber, (ii) since the hollow crimped fiber is used, complexity of entanglement in the planar direction is maintained, and dust cleaning efficiency is maintained, (iii) the low melting point fiber that has been oriented in the thickness direction, cooled, and solidified, acts as a column to enhance stiffness of the nonwoven fabric, (iv) when the low melting point fiber is partially or entirely melted by heat treatment, while the diameter of the low melting point fiber is reduced and space between the fibers is increased, the fibers are easily bound at points at which entanglement of the fibers is performed, thereby maintaining spatial intensity, and water can be unexpectedly retained in the nonwoven fabric, and this structure makes resistance to entry of water advantageous, and (v) stiffness is maintained, and dust holding properties and water retaining properties are greatly improved, and performance of the pre-air-filter is greatly improved as compared to a resin bond type fiber having the same weight, or the like, and the present invention has been completed.

That is, the pre-air-filter, for an internal combustion engine, according to the present invention has the following principal characteristics.

[1] A pre-air-filter for an internal combustion engine, the pre-air-filter containing a nonwoven fabric comprising: a first fiber having a melting point of not lower than 80° C. and not higher than 200° C., a second fiber having a melting point of higher than the melting point of the first fiber by not less than 30° C., being crimped, and having a hollow structure, entanglement of the first fiber and the second fiber by needle punching, and fusion of partly or entirely melted first fiber and the second fiber.

[2] The pre-air-filter according to [1], wherein the entanglement by needle punching is performed by inserting needles from only one side of a fiber web.

[3] The pre-air-filter according to [1] or [2], wherein a fiber orientation degree in a thickness direction is not less than 20° and not greater than 50°.

[4] A pre-air-filter for an internal combustion engine, the pre-air-filter comprising: a first fiber having a melting point of not lower than 80° C. and not higher than 200° C., a second fiber having a melting point of higher than the melting point of the first fiber by not less than 30° C., being crimped, and having a hollow structure, entanglement of the first fiber and the second fiber, fusion of partly or entirely melted first fiber and the second fiber, and a fiber orientation degree in a thickness direction of not less than 20° and not greater than 50°.

[5] The pre-air-filter according to any one of [1] to [4], wherein a density on an air-discharging-side is not less than 1.05 times a density on an air-inlet-side.

[6] The pre-air-filter according to any one of [1] to [5], wherein the second fiber has a fineness of not less than 4 dtex and not greater than 40 dtex, the first fiber has a fineness of not less than 1 dtex and not greater than 40 dtex, and the first fiber is contained in an amount of not less than 20% and not greater than 90% by mass relative to a total of the first fiber and the second fiber.

[7] The pre-air-filter according to [6], wherein a hollow crimped fiber having a fineness of not greater than 12 dtex is contained as the second fiber in a ratio of not less than 10% by mass relative to the entirety of the second fiber.

[8] The pre-air-filter according to any one of [1] to [7], wherein the first fiber is a mixed fiber of a fine fiber having a fineness of not less than 1 dtex and not greater than 10 dtex and a thick fiber having a fineness of greater than 10 dtex and not greater than 40 dtex, and the fine fiber is contained in a ratio of not less than 10% by mass relative to a total of the fine fiber and the thick fiber.

[9] The pre-air-filter according to any one of [1] to [8], wherein the first fiber comprises a rigid fiber having a glass transition temperature of not lower than 10° C. and a flexible fiber having a glass transition temperature of lower than 10° C.

[10] The pre-air-filter according to [8], wherein the fine fiber is a rigid fiber having a glass transition temperature of not lower than 10° C., and the thick fiber comprises a rigid fiber having a glass transition temperature of not lower than 10° C. and a flexible fiber having a glass transition temperature of lower than 10° C.

[11] The pre-air-filter according to any one of [1] to [10], wherein the first fiber and the second fiber are made from a common resin.

[12] The pre-air-filter according to any one of [1] to [11], wherein an average fineness in the entirety of the nonwoven fabric is not less than 7 dtex and not greater than 20 dtex, and a weight per unit area in the entirety of the nonwoven fabric is not less than 50 g/m$^2$ and not greater than 250 g/m$^2$.

[13] An air filter for an internal combustion engine, the air filter comprising: a main-air-filter; and the pre-air-filter according to any one of [1] to [12] which is installed at an air-inlet-side of the main-air-filter.

The air filter, for an internal combustion engine, according to the present invention includes the main-air-filter, and the pre-air-filter provided on the air-inlet-side of the main-air-filter.

Advantageous Effects of the Invention

According to the present invention, since entanglement of a hollow crimped fiber that is crimped and has a hollow structure, and a low melting point fiber is performed by needle-punching, and thermal fusion thereof is thereafter performed, the low melting point fiber allows an orientation degree in the thickness direction to be enhanced in conjunction with the hollow crimped fiber, and stiffness can be enhanced over the entirety of the fiber. Furthermore, since the hollow crimped fiber is used, complexity of meshes in the planar direction is maintained, and dust holding properties can be also enhanced. Moreover, while the diameter of the low melting point fiber is reduced and space between the fibers is increased, the low melting point fiber which is partially or entirely melted and solidified, allows the fibers, such as the hollow crimped fiber, which form the pre-air-filter to be easily bound at points at which entanglement of the fibers is performed. Therefore, water can be retained in the nonwoven fabric, and resistance to entry of water becomes advantageous.

BRIEF DESCRIPTION OF THE DRAWINGS

FIG. 1 is a schematic perspective view of an example of an air filter, for an internal combustion engine, which uses a pre-air-filter according to the present invention; and FIG. 2 is a schematic perspective view of a first fiber and a second fiber that is crimped and has a hollow structure.

DESCRIPTION OF EMBODIMENTS

A pre-air-filter, for an internal combustion engine, according to the present invention includes a fiber web formed from a first fiber (hereinafter, referred to as low melting point fiber) and a second fiber (hereinafter, referred to as hollow crimped fiber), and entanglement of the fiber web by needle punching is performed, and a fiber orientation degree in a thickness direction is enhanced. The first fiber has a melting point of not lower than 80° C. and not higher than 200° C. The second fiber has a melting point of higher than the melting point of the low melting point fiber by not less than 30° C., is crimped, and has a hollow structure (see FIG. 2). Then, the fibers are heated and bound (fused) to each other by thermal bonding, whereby the low melting point fiber which is partially or entirely melted, has its diameter reduced, and fusion of the low melting point fiber and the second fiber is performed, and, while the space between the fibers is increased, the fibers are easily bound to each other at points at which entanglement of the fibers is performed, whereby a space shape can be firmly maintained. When a nonwoven fabric that has a high orientation degree in the thickness direction and has an excellent space shape as described above, is used for a pre-air-filter, stiffness, reduction of pressure loss, enhancement of dust holding properties, and resistance to entry of water can be made advantageous. Hereinafter, each component will be sequentially described.

1. Second Fiber (Hollow Crimped Fiber)

The hollow crimped fiber allows a pre-air-filter to be finished such that the pre-air-filter is lightweight and bulky, allows complexity of meshes, in the planar direction, of the nonwoven fabric to be maintained, and contributes to increase of an amount of collected dust. Further, since the hollow crimped fiber has a bending stiffness, a nonwoven fabric having the hollow crimped fiber blended therewith is less likely to be deformed even when pressure such as airflow is applied, and can be used over a long time period. In a case where the hollow crimped fiber is combined with the first fiber (low melting point fiber) and needle-punched, and thermal fusion of the combined fibers is performed, the stiffness, reduction of pressure loss, enhancement of dust holding properties, and resistance to entry of water can be made advantageous. A high rebound resilience of the hollow crimped fiber contributes to enhancement of water retaining properties of the pre-air-filter.

The hollow crimped fiber has a crimp degree of, for example, preferably not less than 10%, more preferably not less than 12%, and even more preferably not less than 14%. The hollow crimped fiber has a crimp degree of, for example, preferably not greater than 30%, more preferably not greater than 28%, and even more preferably not greater than 25%. By using a fiber having an appropriate crimp degree, the nonwoven fabric can be made lightweight, and can allow a shape in the thickness direction to be maintained.

Further, the hollow crimped fiber has the number of crimps of, for example, preferably not less than 3/inch, more preferably not less than 5/inch, and even more preferably not less than 7/inch. The hollow crimped fiber has the number of crimps of, for example, preferably not greater than 25/inch, more preferably not greater than 20/inch, and even more preferably not greater than 15/inch. In fine crimping in which, for example, the number of crimps is greater than 25/inch, it is difficult to maintain the thickness of the nonwoven fabric. In the present invention, an "inch" is 25.4 mm.

Further, in the present invention, the second fiber (hollow crimped fiber) needs to be hollow. By the hollow structure, weight can be reduced while bulkiness is maintained. The hollow crimped fiber has a degree of hollowness of, for example, preferably not less than 5%, more preferably not less than 7%, and even more preferably not less than 9%. The hollow crimped fiber has a degree of hollowness of, for example, preferably not greater than 60%, more preferably not greater than 45%, and even more preferably not greater than 35%. The appropriate degree of hollowness is effective in that rebound resilience can be maintained, and deterioration due to wind pressure can be inhibited, and, further, resistance to entry of water can be further enhanced.

Examples of the hollow crimped fiber include various fibers such as: a composite fiber (conjugated fiber) having a side-by-side structure or an eccentric structure obtained by simultaneously extruding resins having different thermal shrinkage rates; a bi-component fiber in which fibers having different thermal shrinkage rates are combined; and a hollow crimped fiber in which solidly crimping is developed by a degree of treatment such as heat treatment being made different between the front side and the back side of the fiber. The solid crimped fiber can have a three-dimensionally crimped structure formed in a coil shape, a spiral shape, or the like. Further, the hollow crimped fiber of the present invention may be a mechanically crimped fiber obtained by mechanically crimping a general-purpose chemical fiber. Among the fibers, the composite fiber (conjugated fiber) or the bi-component fiber is more preferably used. Moreover, in the present invention, a hollow crimped fiber which has been crimped before heat treatment in thermal bonding, is preferably used.

The hollow crimped fiber has a melting point of higher than a melting point of the low melting point fiber by not less than 30° C., preferably not less than 50° C., and more preferably not less than 80° C. When the hollow crimped fiber has a melting point of sufficiently higher than the low melting point fiber, the fiber web that includes the hollow crimped fiber and the low melting point fiber can be thermally bonded at not lower than a melting temperature of the low melting point fiber. The upper limit of the melting point is not particularly limited, and a melting point may not even be exhibited (that is, decomposition may start before melting). The hollow crimped fiber has a melting point of typically not lower than 150° C. and not higher than 350° C., and more preferably not lower than 200° C. and not higher than 300° C., depending on a kind of a material of the hollow crimped fiber.

As the hollow crimped fiber, a chemical fiber is typically used. Preferable examples of the fiber to be used include synthetic fibers formed, as materials, from: polyester resins such as polyethylene terephthalate, polybutylene terephthalate, polylactic acid, and polyarylate; polyamide resins such as nylon 6 and nylon 66; acrylic resins such as polyacrylonitrile, and polyacrylonitrile-vinyl chloride copolymers; polyolefin resins such as polyethylene resins and polypropylene resins; polyvinyl alcohol-based resins such as vinylon resins and polyvinyl alcohol resins; polyvinyl chloride-based resins such as polyvinyl chloride resins, vinylidene resins, and polychlal resins; synthetic resins such as polyurethane resins; and polyether resins such as polyethylene oxide resins and polypropylene oxide resins, regenerated fibers such as rayon and polynosic, and semi-synthetic fibers such as acetate fibers and triacetate fibers. In the present invention, a fiber that includes polyester resin as a material is preferably used since the hollow crimped fiber is less likely to be degraded due to heat, moisture, or the like, has an appropriate stiffness, and is easily available.

The hollow crimped fiber has a fineness of, for example, preferably not less than 4 dtex, more preferably not less than 5 dtex, and even more preferably not less than 6 dtex. The hollow crimped fiber has a fineness of, for example, preferably not greater than 40 dtex, more preferably not greater than 20 dtex, and even more preferably not greater than 15 dtex. In a case where a plurality of the hollow crimped fibers having different finenesses are contained, the fineness of the hollow crimped fiber is obtained according to a weighted average in consideration of a ratio (based on mass) of the hollow crimped fibers having the finenesses, respectively.

The hollow crimped fiber preferably includes, in a part or the entirety of the hollow crimped fiber, a hollow crimped fiber (hereinafter, referred to as hollow crimped fine fiber) having a fineness of not greater than 12 dtex, preferably not less than 5 dtex and not greater than 10 dtex, more preferably not less than 6 dtex and not greater than 10 dtex, and particularly preferably not less than 7 dtex and not greater than 8.5 dtex, in a case where the hollow crimped fiber satisfies the above-described average fineness as a whole. In a case where the hollow crimped fine fiber is contained, a dust holding capacity can be further enhanced. The hollow crimped fine fiber is contained in a ratio of, for example, not less than 10% by mass, preferably not less than 50% by mass, more preferably not less than 70% by mass, and particularly preferably 100% by mass, relative to the entirety of the hollow crimped fiber.

The hollow crimped fiber may include a hollow crimped thick fiber having a fineness of greater than 12 dtex in a case where the hollow crimped fiber can satisfy the above-described average fineness.

The hollow crimped fiber (including the fine crimped fiber and the thick crimped fiber) typically has the fineness that is the same between before thermal bonding and after the thermal bonding (that is, also in the pre-air-filter) although the fineness depends on a material of the resin thereof.

A fiber length of the hollow crimped fiber is not particularly limited when the hollow crimped fiber is a short fiber. The hollow crimped fiber has a fiber length that can be selected as appropriate from a range of fiber lengths of, for example, not greater than 300 mm and preferably not greater than 100 mm, and not less than 10 mm and preferably not less than 20 mm. The fiber length of the hollow crimped fiber is measured in a state where the fiber is extended straight without stretching the fiber.

The hollow crimped fiber is contained in a ratio of, for example, preferably not less than 10% by mass, more preferably not less than 12% by mass, and even more preferably not less than 15% by mass, relative to a total of the low melting point fiber and the hollow crimped fiber. The hollow crimped fiber is contained in a ratio of, for example, preferably not greater than 80% by mass, more preferably not greater than 70% by mass, and even more preferably not greater than 60% by mass, relative to a total of the low melting point fiber and the hollow crimped fiber.

2. First Fiber (Low Melting Point Fiber)

The low melting point fiber is used instead of a binder resin according to a conventional method by resin bonding, in order to firmly bind the nonwoven fabric. In a case where the low melting point fiber is used, adhesion between the fibers and stiffness, which are required for the pre-air-filter, can be obtained. Therefore, a process step of applying a binder resin through impregnation, spraying, or the like and then performing drying for removing unnecessary moisture as in the conventional art can be reduced. Further, since strength of adhesion between the fibers is high in the binding by the low melting point fiber, yarns left on the cut end surface is also advantageously reduced in punching and cutting into a necessary size. Further, the low melting point fiber is advantageous in that the low melting point fiber is more inexpensive than, for example, polyacrylic acid ester-based resins, polyester resins, synthetic rubber-based resins, urethane-based resins, and vinyl chloride-based resins which are typically used as a binder resin. The low melting point fiber as described above and the hollow crimped fiber are combined, needle-punched, and bound to each other by thermal bonding, whereby the orientation degree in the thickness direction is enhanced, and stiffness, dust holding properties, reduction of pressure loss, and resistance to entry of water in the nonwoven fabric, are achieved.

The low melting point fiber has a melting point of not lower than 80° C., preferably not lower than 90° C., and more preferably not lower than 100° C. The upper limit of the melting point can be set as appropriate according to, for example, a temperature at which the thermal bonding can be performed or heat resistance of the hollow crimped fiber. The low melting point fiber has a melting point of, for example, not higher than 200° C., preferably not higher than 180° C., and more preferably not higher than 160° C. In a case where the low melting point fiber is formed by combining a plurality of resins having different melting points with each other (for example, in the case of a core-sheath structure, an eccentric structure, a side-by-side structure, or the like), a melting point of a resin having a lowest melting point is regarded as a melting point of the low melting point fiber.

Examples of the low melting point fiber include: a composite fiber, having a core-sheath structure, an eccentric structure, or a side-by-side structure, in which a plurality of resins having different melting points are combined; modified polyester fibers; modified polyamide fibers; and modified polyolefin fibers such as modified polypropylene fibers. Examples of the combination of resins used for the composite fiber include not only a combination of polyolefins such as a combination of polyethylene-polypropylene and a combination of polypropylene-modified polypropylene, but also a combination of polyethylene-polyester, a combination of polyester-modified polyester, a combination of nylon-modified nylon, and the like. Further, depending on a melting point, a low melting point fiber formed from a single resin can be used. Among them, a composite fiber having a core-sheath structure is preferably used since productivity is good and it is easily available, and a composite fiber which is formed from polyester-modified polyester resin and has a core-sheath structure, is particularly preferably used since a melting point can be selected from a wide range. Meanwhile, use of a low melting point fiber formed from a polyolefin such as polyethylene-polypropylene or polypropylene-modified polypropylene can be suggested in order to increase a dust holding capacity since an orientation degree in the thickness direction tends to be increased in such polyolefins.

The low melting point fiber has a fineness of preferably not less than 1 dtex, more preferably not less than 1.5 dtex, and even more preferably not less than 2 dtex. The low melting point fiber has a fineness of preferably not greater than 40 dtex, more preferably not greater than 30 dtex, and even more preferably not greater than 20 dtex. In a case where a plurality of low melting point fibers having different finenesses are contained, the fineness of the low melting point fiber is obtained according to a weighted average in consideration of a ratio (based on mass) of the low melting point fibers having the finenesses, respectively.

The low melting point fiber is preferably used as a mixed fiber that includes a fine low-melting-point fiber having a fineness of not less than 1 dtex (preferably not less than 1.5 dtex and more preferably not less than 2 dtex) and of not greater than 10 dtex (preferably not greater than 8 dtex and more preferably not greater than 5 dtex), and a thick low-melting-point fiber having a fineness of greater than 10 dtex (preferably not less than 12 dtex and more preferably not less than 14 dtex) and of not greater than 40 dtex (preferably not greater than 30 dtex and more preferably not greater than 20 dtex). The thick low-melting-point fiber is effective in order to enhance a fiber orientation degree in the thickness direction by needle punching. In particular, the thick low-melting-point fiber allows a columnar structure that is strong in the thickness direction to be introduced by the fine low-melting-point fiber and the hollow crimped fiber being combined and needle-punched and thereafter subjected to thermal bonding. Further, the thick low-melting-point fiber is effective in order to form a space for retaining water by reducing the diameter thereof by heat treatment in the thermal bonding.

The fine low-melting-point fiber is contained in a ratio of, for example, preferably not less than 10% by mass, more preferably not less than 20% by mass, and even more preferably not less than 30% by mass, relative to a total of the fine low-melting-point fiber and the thick low-melting-point fiber. The fine low-melting-point fiber is contained in a ratio of, for example, preferably not greater than 100% by mass, more preferably not greater than 70% by mass, even more preferably not greater than 50% by mass, and particularly preferably not greater than 45% by mass, relative to a total of the fine low-melting-point fiber and the thick low-melting-point fiber.

The fineness of the low melting point fiber represents a fineness before the thermal bonding. In a case where, for example, the low melting point fiber has a core-sheath structure, a weight ratio between a core and a sheath is typically 30:70 to 70:30 (more preferably 40:60 to 60:40 and even more preferably approximately 50:50), and the fineness of the low melting point fiber after the thermal bonding is typically 0.3 to 1 times the fineness thereof before the thermal bonding. The low melting point fiber has a fineness, after the thermal bonding, of, for example, preferably not less than 0.4 dtex, more preferably not less than 0.6 dtex, and even more preferably not less than 0.8 dtex. The low melting point fiber has a fineness, after the thermal bonding, of, for example, preferably not greater than 36 dtex, more preferably not greater than 27 dtex, and even more preferably not greater than 18 dtex.

The low melting point fiber is preferably a rigid fiber having a glass transition temperature of not lower than 10° C. By using the rigid fiber, stiffness of the pre-air-filter can be assured. The rigid fiber has a glass transition temperature of preferably not lower than 20° C. and more preferably not lower than 30° C. The rigid fiber has a glass transition temperature of, for example, preferably not higher than 90° C. and more preferably not higher than 70° C.

Further, in a case where the low melting point fiber is formed by combining a plurality of fibers with each other, a flexible fiber having a glass transition temperature of lower than 10° C. is preferably combined with the rigid fiber. By using the flexible fiber, while stiffness of the pre-air-filter is maintained, a flexible columnar structure which is less likely to be bent can be introduced. The flexible fiber has a glass transition temperature of preferably not higher than 8° C., more preferably not higher than 5° C., and even more preferably not higher than 2° C. The lower limit of the glass transition temperature of the flexible fiber is not particularly limited, and the flexible fiber may have a glass transition temperature of, for example, not lower than −10° C. or not lower than −5° C.

In a case where the flexible fiber is used, the flexible fiber is contained in a ratio of, for example, preferably not less than 10% by mass, more preferably not less than 15% by mass, and even more preferably not less than 20% by mass, relative to the entirety of the low melting point fiber. The flexible fiber is contained in a ratio of, for example, preferably not greater than 80% by mass, more preferably not greater than 60% by mass, and even more preferably not greater than 50% by mass, relative to the entirety of the low melting point fiber.

In a case where the low melting point fiber is formed from both the fine low-melting-point fiber and the thick low-melting-point fiber, a rigid fiber having a glass transition temperature of not lower than 10° C. is preferably used as the fine low-melting-point fiber, and a rigid fiber having a glass transition temperature of not lower than 10° C. and a flexible fiber having a glass transition temperature of lower than 10° C. are preferably used in combination as the thick low-melting-point fiber. In the thick low-melting-point fiber, a ratio (mass ratio) of the rigid fiber to the flexible fiber is, for example, preferably 10/90 to 90/10, more preferably 30/70 to 70/30, and even more preferably 40/60 to 60/40.

The low melting point fiber is contained in a ratio of, for example, not less than 20% by mass, preferably not less than 30% by mass, and more preferably not less than 40% by mass, relative to a total of the hollow crimped fiber and the low melting point fiber. The low melting point fiber is contained in a ratio of, for example, not greater than 90% by mass, preferably not greater than 85% by mass, and more preferably not greater than 80% by mass, relative to a total of the hollow crimped fiber and the low melting point fiber.

A fiber length of the low melting point fiber is not particularly limited in a case where the low melting point fiber is a short fiber. The low melting point fiber has a fiber length of, for example, preferably not greater than 300 mm and more preferably not greater than 100 mm. The low melting point fiber has a fiber length of, for example, preferably not less than 10 mm and more preferably not less than 20 mm.

3. Other Fibers

In the present invention, a fiber other than the hollow crimped fiber and the low melting point fiber may be used. Examples of the other fiber include natural fibers and non-hollow crimped fibers having a melting point in a range equivalent to that for the hollow crimped fiber. Specifically, examples of the other fiber include: natural fibers such as cotton, hemp, wool, and silk; regenerated fibers such as rayon, polynosic, cupra, and lyocell; semi-synthetic fibers such as acetate fibers and triacetate fibers; polyamide fibers such as nylon 6 and nylon 66; polyester fibers such as polyethylene terephthalate fibers, polybutylene terephthalate fibers, polylactic acid fibers, and polyarylate fibers; acrylic fibers such as polyacrylonitrile fibers and polyacrylonitrile-vinyl chloride copolymer fibers; polyolefin fibers such as polyethylene fibers and polypropylene fibers; polyvinyl alcohol-based fibers such as vinylon fibers and polyvinyl alcohol fibers; polyvinyl chloride-based fibers such as polyvinyl chloride fibers, vinylidene fibers, and polychlal fibers; synthetic fibers such as polyurethane fibers; and polyether fibers such as polyethylene oxide fibers and polypropylene oxide fibers.

The other fiber has a fineness and a fiber length that can be each selected from a range equivalent to that for the hollow crimped fiber.

The hollow crimped fiber, the low melting point fiber, and the other fiber used as appropriate are preferably fibers (in particular, chemical fibers) formed from a common resin. The common resin include one resin and a modified resin thereof. For example, in a case where the one resin is a polyester resin, a polyester resin and a modified polyester resin are contained in a range of the common resin. By using a common resin, recyclability of the pre-air-filter is enhanced.

In the present invention, the pre-air-filter includes the first fiber and the second fiber in a ratio of, for example, not less than 70% by mass, preferably not less than 80% by mass, and more preferably not less than 90% by mass, relative to the entirety of the fiber. The pre-air-filter may include the first fiber and the second fiber in a ratio of 100% by mass. The remainder is the other fiber.

The hollow crimped fiber, the low melting point fiber, and the other fiber used as appropriate are subjected to blending, carding, and cross wrapping, to be formed into a stacked fiber web. When the fiber web has been formed, a weighted average fineness of the entirety of the fiber is, for example, preferably not less than 7 dtex, more preferably not less than 8 dtex, and even more preferably not less than 9 dtex. A weighted average fineness of the entirety of the fiber is, for example, preferably not greater than 20 dtex, more preferably not greater than 17 dtex, and even more preferably not greater than 15 dtex.

When the fiber web has been formed, a fiber weight per unit area (weight per unit area based on only the mass of the fiber) and a total weight per unit area (weight per unit area based on all of used resin components) are, for example, preferably not less than 50 g/m$^2$, more preferably not less than 80 g/m$^2$, and even more preferably not less than 100 g/m$^2$. A fiber weight per unit area and a total weight per unit area are, for example, preferably not greater than 250 g/m$^2$, more preferably not greater than 200 g/m$^2$, and even more preferably not greater than 180 g/m$^2$. In the stacked fiber web, the fiber weight per unit area and the total weight per unit area are equivalent to the fiber weight per unit area and the total weight per unit area in the nonwoven fabric or the pre-air-filter. In the present invention, even if the fiber weight per unit area and the total weight per unit area are made small, stiffness can be made excellent, and the nonwoven fabric or the pre-air-filter can be made lightweight.

In the present invention, a binder resin may be sprayed in a small amount in such a range as to satisfy the total weight per unit area, and resin bonding may be performed in combination. However, it is advantageous that spraying of a binder resin and impregnation with the binder resin are not performed.

4. Needle Punching

In the fiber web that includes the hollow crimped fiber and the low melting point fiber, the fiber is oriented in the planar direction. By the fiber web being needle-punched, an orientation degree, in the thickness direction, of the fiber can be enhanced. In a case where a non-hollow crimped fiber is used, even if a low melting point fiber is used, it is difficult to enhance an orientation degree in the thickness direction. Only in a case where the hollow crimped fiber and the low melting point fiber are used in combination, an orientation degree in the thickness direction is enhanced. By further performing thermal bonding in combination, stiffness, dust holding properties, reduction of pressure loss, and resistance to entry of water in the pre-air-filter can be achieved. More specifically, although a nonwoven fabric having fibers oriented in the thickness direction has very excellent stiffness and properties for maintaining the thickness under a load due to dust, since a fiber density is low in the pre-air-filter, separation between layers in the fiber web or dust leakage is likely to occur. Meanwhile, although a nonwoven fabric having fibers oriented in the planar direction has an excellent dust collecting performance, stiffness in the thickness direction is poor. Therefore, setting resistance in the thickness direction is reduced under a load due to dust, and a dust holding capacity tends to be reduced. In a case where the hollow crimped fiber is blended in the stacked fiber web arranged in the planar direction, also when the fiber web is formed in the planar direction, the hollow crimped fiber contained in the fiber web is oriented also in the thickness direction, and, further, by a part of the fiber web being oriented in the thickness direction by needle punching, stiffness in the thickness direction is enhanced, and a collecting performance as a filter is enhanced. The orientation degree, in the thickness direction, of the fiber can be evaluated according to an orientation degree of an obtained pre-air-filter.

Entanglement by the needle punching is preferably performed by inserting needles from only one side of the nonwoven fabric. By performing the needle punching from one surface side of the fiber web, a density gradient structure can be formed so as to be continuous in the thickness direction even in a single layer. The density gradient can be formed more easily than a density gradient obtained by stacking a plurality of layers of the fiber web, and can be made gentler. The magnitude of the density gradient can be evaluated in an obtained pre-air-filter.

In the needle punching, a needle has a thickness of, for example, preferably not greater than 0.78 mm, more preferably not greater than 0.75 mm, and even more preferably not greater than 0.70 mm. A needle has a thickness of, for example, preferably not less than 0.35 mm, more preferably not less than 0.40 mm, and even more preferably not less than 0.45 mm. Two kinds of needles having different thicknesses may be used in combination. For example, a thick needle having a thickness of not less than 0.60 mm (preferably not greater than 0.78 mm) and a fine needle having a thickness of less than 0.60 mm (more preferably not less than 0.35 mm) may be used in combination. A large fiber bundle is formed by performing punching with thick needles, and the fibers are oriented in the thickness direction. Meanwhile, by also using fine needles, while a fiber orientation degree in the thickness direction is moderated, a punch hole is prevented from being excessively large, to enable a punch surface to have a high density.

As a relationship between the thickness of a needle and a needle size, size 28 (0.78 mm), size 30 (0.75 mm), size 32 (0.70 mm), size 42 (0.45 mm), size 44 (0.40 mm), and size 46 (0.35 mm) are known in general. However, the present invention is not limited thereto.

The number of needle punches (the number of penetrations) per unit area is, for example, preferably 15 to 25 punches/cm$^2$, more preferably 17 to 23 punches/cm$^2$, and even more preferably 18 to 22 punches/cm$^2$.

In the needle punching, adjustment may be performed such that a needle which is inserted from the front surface is prevented from penetrating to the back surface (that is, the needle depth is 0 mm). In a case where entanglement of the fibers to a certain depth of the nonwoven fabric in the thickness direction is performed without entanglement of the fibers over the entirety of the nonwoven fabric, an orientation gradient of the fiber in the thickness direction is likely to be formed.

5. Thermal Bonding

The fiber web obtained by the needle punching as described above is heated to a temperature that is not lower than the melting point of the low melting point fiber, and lower than the melting point of the hollow crimped fiber, whereby the fibers are adhered and bound to each other by the melted fiber, and the shape of the nonwoven fabric is fixed, and strength can be assured. According to the present invention, in the thermal bonding, the diameter of the low melting point fiber is reduced, and fusion of the second fiber and the partially or entirely melted first fiber is performed, whereby a space for retaining water can be formed. The fibers can be assuredly adhered and bound, by the low melting point fiber, at points at which entanglement of the fibers is performed. Therefore, the spatial intensity can be enhanced, the shape of the space can be maintained even when water is retained, water can be prevented from being formed into a film, and increase of pressure loss in retaining of water can be inhibited.

A heating temperature in the thermal bonding is, for example, preferably not lower than 100° C., more preferably not lower than 120° C., and even more preferably not lower than 140° C. A heating temperature in the thermal bonding is, for example, preferably not higher than 200° C., more preferably not higher than 190° C., and even more preferably not higher than 180° C.

A heating time is, for example, preferably not shorter than 10 seconds, more preferably not shorter than 20 seconds, and even more preferably not shorter than 30 seconds. A heating time is, for example, preferably not longer than 5 minutes, more preferably not longer than 3 minutes, and even more preferably not longer than 2 minutes.

6. Air Filter

The nonwoven fabric obtained by the thermal bonding as described above is cut into an appropriate form and thus formed as a pre-air-filter. Further, before or after the cutting, the needle-punched surface may be subjected to smoothing through a heating roll or a heating plate as appropriate. By the smoothing, a needle-punched hole can be made smaller, and, further, fluffing on the needle-punched surface can be prevented and a density in a high density surface can be increased to enhance collection efficiency. In addition, stiffness of the nonwoven fabric is increased, whereby handling and cutting processability are also improved. Discrimination between the front side and the back side of the pre-air-filter is facilitated.

The pre-air-filter acts to protect a main filter installed in an intake system of an internal combustion engine, and is installed on the upstream side (air inlet-side) of the main-air-filter in the intake system. FIG. 1 is a partially cut-away schematic perspective view of one example of an air filter, for an internal combustion engine, which includes the pre-air-filter and a main-air-filter. A main-air-filter 2 in the illustrated example includes a plurality of aligned filter members 4 obtained by pleating a nonwoven fabric or filter paper, and a frame member 3 to which the filter members 4 are fixed. A pre-air-filter 1 is installed on the air-inlet-side of the main-air-filter 2. Air to be supplied to the internal combustion engine firstly passes through the pre-air-filter 1 and dust is roughly eliminated, and, subsequently, fine dust is also eliminated through the main-air-filter 2.

In the pre-air-filter of the present invention, the hollow crimped fiber is fixed by the low melting point fiber, and a fiber orientation degree in the thickness direction indicates an appropriate value, and a density gradient is excellent although the filter is formed in a single layer. Therefore, stiffness and a dust holding capacity are excellent, and reduction of pressure loss is achieved. In addition, resistance to entry of water is excellent. Therefore, the main-air-filter can be effectively protected over a long time period, and, further, dust collection efficiency can be enhanced.

The magnitude of the density gradient can be evaluated according to a ratio between a density of the pre-air-filter on the air-discharging-side and a density thereof on the air-inlet-side, and the magnitude can be set as appropriate according to a required filter performance. A density on the air-discharging-side may be, for example, preferably not less than 1.05 times, more preferably not less than 1.10 times, and even more preferably not less than 1.3 times a density on the air-inlet-side. A density on the air-discharging-side may be, for example, preferably not greater than 3.0 times, more preferably not greater than 2.6 times, and even more preferably not greater than 2.0 times a density on the air-inlet-side. In such a range, a dust holding capacity can be further increased, and a lifespan of the filter can be further elongated.

The pre-air-filter has a density, on the air-discharging-side, of, for example, preferably not less than 0.012 g/cm$^3$, more preferably not less than 0.018 g/cm$^3$, and even more preferably not less than 0.022 g/cm$^3$. The pre-air-filter has a density, on the air-discharging-side, of, for example, preferably not greater than 0.04 g/cm$^3$, more preferably not greater than 0.035 g/cm$^3$, and even more preferably not greater than 0.030 g/cm$^3$.

The pre-air-filter has a density, on the air-inlet-side, of, for example, preferably not less than 0.005 g/cm$^3$, more preferably not less than 0.008 g/cm$^3$, and even more preferably not less than 0.010 g/cm$^3$. The pre-air-filter has a density, on the air-inlet-side, of, for example, preferably not greater than 0.025 g/cm$^3$, more preferably not greater than 0.020 g/cm$^3$, and even more preferably not greater than 0.018 g/cm$^3$.

The pre-air-filter has an overall density of, for example, preferably not less than 0.010 g/cm$^3$, more preferably not less than 0.012 g/cm$^3$, and even more preferably not less than 0.014 g/cm$^3$. The pre-air-filter has an overall density of, for example, preferably not greater than 0.030 g/cm$^3$, more preferably not greater than 0.026 g/cm$^3$, and even more preferably not greater than 0.023 g/cm$^3$.

The pre-air-filter has a fiber orientation degree, in a thickness direction, of, for example, preferably not less than 20°, more preferably not less than 25°, and even more preferably not less than 30°. The pre-air-filter has a fiber orientation degree, in a thickness direction, of, for example, preferably not greater than 50°, more preferably not greater than 45°, and even more preferably not greater than 40°. The fiber orientation degree can be measured by a method described in examples.

The pre-air-filter has an apparent thickness of, for example, preferably not less than 3 mm, more preferably not less than 5 mm, and even more preferably not less than 6 mm. The pre-air-filter has an apparent thickness of, for example, preferably not greater than 12 mm, more preferably not greater than 10 mm, and even more preferably not greater than 8 mm.

In a pressure loss test of the pre-air-filter of the present invention as described below in examples, the pre-air-filter has a pressure loss of, for example, not greater than 40 Pa, preferably not greater than 30 Pa, and more preferably not greater than 25 Pa. The lower limit of the pressure lass is not particularly limited, and may be, for example, about 15 Pa. In particular, even when the lower limit of the pressure loss is about 20 Pa, it can be said that the pre-air-filter is good In a test of the pre-air-filter of the present invention for thickness reduction under a load due to dust as described below in examples, the pre-air-filter has a thickness reduction of, for example, not less than 88%, preferably not less than 90%, and more preferably not less than 92%. Further, the upper limit of the thickness reduction is not particularly limited. The pre-air-filter has a thickness reduction of, for example, not greater than 100%. In particular, even when the pre-air-filter has a thickness reduction of not greater than 97%, it can be said that the pre-air-filter is good.

In a dust holding test of the pre-air filter as described below in examples, the pre-air filter has a dust holding capacity of, for example, not less than 90 g/0.1 m$^2$, preferably not less than 100 g/0.1 m$^2$, and more preferably not less than 120 g/0.1 m$^2$. The upper limit of the dust holding capacity is not particularly limited. The pre-air-filter has a dust holding capacity of, for example, not greater than 300 g/0.1 m$^2$. In particular, even when the pre-air-filter has a dust holding capacity of not greater than 200 g/0.1 m$^2$, it can be said that the pre-air-filter is good.

In a water leakage test of the pre-air-filter as described below in examples, water leakage is rarely observed on the surface of the pre-air-filter on the discharging side after the test, and water enters the inside of the pre-air-filter, and is retained. Therefore, the pre-air-filter has an extremely high water retention amount, that is, has a water retention amount of 5.5 to 12 g (more preferably, 6.0 to 11 g) in the water leakage test.

As the main-air-filter, various known filters can be used. A main-air filter that is particularly suitable for combination with the pre-air-filter of the present invention is an air filter for which a filter medium formed from filter paper or a nonwoven fabric is used, and is particularly preferably an air filter for which a filter medium formed from filter paper that has a high density and that can exhibit high dust cleaning efficiency is used. In particular, the air filter is a filter obtained by stacking a plurality of layers having different densities, and the air filter has, for example, the following characteristics.

1) Air Flow Resistance

The main-air-filter has an air flow resistance of, for example, not less than 100 Pa and preferably not less than 200 Pa. The main-air-filter has an air flow resistance of, for example, not greater than 400 Pa and preferably not greater than 300 Pa.

The air flow resistance is a value obtained by performing the test under the following conditions in compliance with JIS D1612 (Test Methods of Air Cleaners for Automobiles).

Effective filtration area: 1760 cm$^2$, projected area: 281 cm$^2$, air amount: 5.7 m$^3$/minute, velocity of air: 54 cm/second 2) Dust Collection Efficiency, Collection Amount The main-air-filter has a dust collection efficiency of, for example, not less than 90%, preferably not less than 95%, and more preferably not less than 97%. The upper limit thereof is not particularly limited, and is, for example, preferably 100%.

Further, the main-air-filter has a dust collection amount of, for example, not less than 70 g, preferably not less than 100 g, and more preferably not less than 120 g. The main-air-filter has a dust collection amount of, for example, not greater than 200 g and preferably not greater than 180 g.

The dust collection efficiency and collection amount are values obtained in compliance with JIS D1612 (Test Methods of Air Cleaners for Automobiles). Particularly, the dust collection efficiency is a value obtained by performing the full life cleanliness efficiency test in compliance with 9.4 (3) of JIS D1612, and the dust collection amount is a value obtained in compliance with 10 of JIS D1612. The conditions for each test are set as follows.

Effective filtration area: 1760 cm$^2$, air amount: 5.7 m$^3$/minute, velocity of air: 54 cm/second, dust: Class 8 in JIS Z8901, dust concentration: 1 g/m$^3$, condition in which test is ended: when increased resistance is 300 mmAq.

Examples of an internal combustion engine for which the air filter of the present invention can be used include piston engines (reciprocating engines), rotary engines, gas-turbine engines, and jet engines. The internal combustion engine is, for example, preferably an automobile engine.

The present application claims for benefit of priority based on Japanese Patent Application No. 2015-034054 filed on Feb. 24, 2015. The entirety of the specification of Japanese Patent Application No. 2015-034054 filed on Feb. 24, 2015 is incorporated herein for reference.

EXAMPLES

The following will describe the present invention more specifically by means of examples. However, the present invention is not limited by the following examples, and it is naturally possible to practice the present invention with appropriate modifications as long as they conform to the gist in the descriptions above and below, and these modifications are included in the technological scope of the present invention.

The method for evaluating the nonwoven fabric, which is adopted in the specification of the present application, is as follows.

(1) Average fineness; A weighted average of finenesses of used fibers was obtained according to masses of the used fibers.

(2) Crimp degree; obtained in compliance with the 8.12.2 method of JIS L1015

(3) Degree of hollowness; calculated according to a photograph of a fiber cross-section by using the following expression.

Degree of hollowness (%)=(cross-sectional area of hollow portion/cross-sectional area of fiber)×100

(4) The number of crimps; obtained in compliance with the 7.12 method of JIS L 1015.

(5) Fiber length; measured in compliance with the C) direct method (C method) of 8.4.1 in JIS L 1015, on a ruler, by extending the fiber straight without stretching the fiber.

(6) Weight per unit area; obtained in compliance with the 6.2 method of JIS L1.913.

(7) Apparent thickness; an apparent thickness was measured by using a JIS class 1 steel rule.

(8) Overall density; obtained by dividing a weight per unit area in the entirety of the pre-air-filter by an apparent thickness of the entirety of the pre-air filter.

(9) Density on inlet side, density on discharging side, density ratio

The fabric was cut at a cross-section by a sharp cutter so as to halve the thickness, and the fabric was separated into an inlet-side fabric and a discharging-side fabric. A weight per unit area and an apparent thickness of each fabric were measured and calculations according to the following expressions were performed.

Density (g/cm$^3$) on inlet side=weight per unit area on inlet side/apparent thickness on inlet side Density (g/cm$^3$) on discharging side=weight per unit area on discharging side/apparent thickness on the discharging side Density ratio=density on discharging side/density on inlet side

(10) Fiber orientation degree in thickness direction

An image of the cross-section of the pre-air-filter was taken by using a scanning electron microscope, TM3000 type MINISCOPE manufactured by Hitachi High-Technologies Corporation, at 40× magnification. When the image was taken, a zero point alignment was performed such that the transverse direction and the longitudinal direction of a taken photograph, corresponded to the machine direction (MD) and the width direction (CD) of the nonwoven fabric.

Thereafter, the taken image was printed on an A4 size sheet, and angles for all the fibers contained in any 1 mm$^2$ area on the discharging side in the image were measured, by using a protractor, at intervals of the length of 0.1 mm. The average angle of the measured angles was determined as a fiber orientation degree. Evaluation was performed by using angles from 0° to 90°. In the case of the angle being greater than 90°, an angle obtained by (180°—measured value) was used for evaluating the fiber orientation degree.

(11) water leakage test

A water repellency testing device in compliance with the 7.2 method of JIS L1092 was used to perform evaluation.

A 200 mm×200 mm test piece of which the weight was previously measured was set at a test piece holder, and 250 ml of water was poured into a funnel and sprayed onto the test piece.

After two minutes elapsed since start of the spraying of the water, the test piece was taken out, and a state of water attached to the surface was visually observed, and pressure loss characteristics were evaluated according to the following criteria.

Good: An amount of water attached to the surface was small, and water had entered the inside of the nonwoven fabric.

Poor: A large amount of water was attached to the surface (that is, pressure loss was great).

Excess water attached to the surface was removed, and the weight of the test piece was thereafter measured, and the calculation according to the following expression was performed.

Water retention amount (g)=weight (g) of test piece after test−weight (g) of test piece before test The water leakage was evaluated by visually checking and touching the surface of the test piece on the discharging side after the test and determining whether or not water leakage occurred.

(12) Thickness reduction under load due to dust

An apparent thickness ($t_0$) of a test piece having dimensions of 200 mm×200 mm was measured. Thereafter, an apparent thickness ($t_1$) was measured in a state where the test piece was under 15 kg/m² load, and calculation according to the following expression was performed.

Thickness reduction (%) under load due to dust=($t_1$/$t_0$)×100

(13) Pressure loss

Pressure loss was able to be measured by performing a test under the following conditions in compliance with JIS D1612 (Test Methods of Air Cleaners for Automobiles).

Effective filtration area: 0.1 m², air amount: 3.6 m³/minute, velocity of air: 60 cm/second

(14) Dust holding capacity

Class 8 powder of JIS Z8901 was caused to enter at an air amount of 3.6 m³/min according to the full life cleanliness efficiency test in compliance with 9.4 (3) of JIS D1612. When an increased resistance was 150 mmAq, the test was ended, and a dust holding capacity at that time was determined.

Example 1

As a high melting point fiber, 20% by weight of a hollow actualized crimped polyester fiber (polyethylene terephthalate (PET), melting point of 260° C., fineness of 6.6 dtex, fiber length of 51 mm, crimp degree of 20%, the number of crimps of 9/inch, degree of hollowness of 27%), 15% by weight of a first low melting point polyester fiber (the core was PET, the sheath was modified polyester (L-PET), melting point of 110° C. glass transition temperature of 60'C, fineness of 4.4 dtex, fiber length of 51 mm), and 65% by weight of a second low melting point polyester fiber (the core was PET, the sheath was modified polyester (L-PET), melting point of 110° C., glass transition temperature of 60° C., fineness of 17 dtex, fiber length of 51 mm) were each measured, and blended, and were thereafter subjected to carding and then cross wrapping, to obtain a stacked fiber web. The stacked fiber web was needle-punched from one surface side by needles of the needle size of 40 (manufactured by ORGAN NEEDLE CO., LTD.: FPD1-40, the dimension of a blade was 0.50 mm) with the number of needles being 20 needles/cm, and the needle depth being 0 mm. Subsequently, heat treatment was performed for one minute in a conveyer-type continuous heat treatment machine where the temperature of hot air was maintained at 160° C., and a short-fiber nonwoven fabric, for a pre-air-filter, having a weight per unit area of 150 g/m² and an apparent thickness of 7.2 mm was obtained.

Examples 2 to 7, Comparative Examples 1 to 2

Examples 2 to 7 and comparative examples 1 to 2 were each implemented in the same manner as in example 1 except that types and amounts of a high melting point fiber and a low melting point fiber were changed as indicated below in Tables 1 to 2, and conditions for needle punching were changed as indicated in Tables 1 to 2.

Fibers used in these production examples were as indicated below.

The "hollow actualized crimped fiber (conjugate)" is a hollow crimped fiber having a side-by-side structure, is formed from polyethylene terephthalate (PET), and has a melting point of 260° C., a fineness of 7.7 dtex, a fiber length of 51 mm, a crimp degree of 16%, the number of crimps of 8/inch, and a degree of hollowness of 10%.

The "non-hollow fiber" is a solid crimped fiber which is formed from polyethylene terephthalate (PET), and has a melting point of 260° C., a fiber length of 51 mm, and a crimp degree, the number of crimps, and a fineness which are indicated in the tables.

The "L-PP" represents a low melting point fiber which is formed from polyethylene resin and polypropylene resin, and has a melting point of 130° C., a glass transition temperature of −20° C., a fineness of 20 dtex, and a fiber length of 64 mm.

Comparative Example 3

A short-fiber nonwoven fabric for a pre-air-filter was obtained in the same manner as in Example 1 except that entanglement of fibers by needle punching was not performed.

Comparative Examples 4 to 5

100% by weight of a non-hollow fiber (polyethylene terephthalate (PET), melting point of 260° C., fineness of 6.6 dtex or 17 dtex, and fiber length of 51 mm) was measured and carded, and were subsequently subjected to cross wrapping, to obtain a stacked fiber web. The stacked fiber web was needle-punched from one surface side under the conditions indicated in Table 2, and acrylic emulsion was thereafter sprayed to the stacked fiber web, and the stacked fiber web was impregnated therewith. Heat treatment and drying were performed for five minutes in a conveyor-type continuous heat treatment machine where the temperature of hot air was maintained at 150° C., to obtain a short-fiber nonwoven fabric for a pre-air-filter.

The characteristics of the short-fiber nonwoven fabric, for a pre-air filter, obtained in each of examples and comparative examples were evaluated. The results are indicated in Tables 1 to 2.

TABLE 1

| Items | | | | | | | Example 1 | Example 2 | Example 3 | Example 4 | Example 5 | Example 6 | Example 7 |
|---|---|---|---|---|---|---|---|---|---|---|---|---|---|
| Amount of high melting point fiber (parts by mass) | Hollow actualized crimped fiber | PET | Melting point of 260° C. | Crimp degree of 20%, the number of crimps of 9/inch | Degree of hollowness of 27% | 6.6 dtex × 51 mm | 20 | 20 | 20 | — | — | — | 20 |
| | | | | Crimp degree of 22%, the number of crimps of 8/inch | | 14.4 dtex × 51 mm | — | — | — | — | — | — | 40 |

TABLE 1-continued

| | | | | | | | Example 1 | Example 2 | Example 3 | Example 4 | Example 5 | Example 6 | Example 7 |
|---|---|---|---|---|---|---|---|---|---|---|---|---|---|
| | Hollow actualized crimped fiber (conjugate) | PET | Melting point of 260° C. | Crimp degree of 16%, the number of crimps of 8/inch | Degree of hollowness of 10% | 7.7 dtex × 51 mm | — | — | — | 20 | 20 | 20 | — |
| | Non-hollow fiber | PET | Melting point of 260° C. | Crimp degree of 25%, the number of crimps of 10/inch | Degree of hollowness of 0% | 6.6 dtex × 51 mm | — | — | — | — | — | — | — |
| | | | | Crimp degree of 24%, the number of crimps of 8/inch | | 17 dtex × 51 mm | — | — | — | — | — | — | — |
| Amount of low melting point fiber (parts by mass) | Low melting point fiber | L-PET | Melting point of 110° C. | Tg60° C. | | 2.2 dtex × 51 mm | — | — | 30 | — | — | — | — |
| | | | | | | 4.4 dtex × 51 mm | 15 | 25 | — | 15 | 15 | 15 | 40 |
| | | | | | | 17 dtex × 51 mm | 65 | 55 | 50 | 65 | 65 | 35 | — |
| | Low melting point fiber | L-PP | Melting point of 130° C. | Tg−20° C. | | 20 dtex × 64 mm | — | — | — | — | — | 30 | — |
| | | | Type of binder | | | | — | — | — | — | — | — | — |
| | | | Needle size | | | | 40 | 40 | 40 | 40 | 40/32 | 40 | 40 |
| | | | The number of needles (g/cm³) | | | | 20 | 20 | 20 | 20 | 20 | 20 | 20 |
| | | | Needle depth (mm) | | | | 0 | 0 | 0 | 0 | 0 | 0 | 0 |
| | | | Average fineness (dtex) | | | | 13.03 | 11.77 | 10.48 | 13.25 | 13.25 | 14.15 | 8.84 |
| | | | Fiber weight per unit area (g/m²) | | | | 150 | 150 | 150 | 150 | 150 | 150 | 200 |
| | | | Resin weight per unit area (g/m²) | | | | — | — | — | — | — | — | — |
| | | | Total weight per unit area (g/m²) | | | | 150 | 150 | 150 | 150 | 150 | 150 | 200 |
| | | | Apparent thickness (mm) | | | | 7.2 | 6.9 | 7.1 | 7.2 | 8.5 | 11.0 | 10.0 |
| | | | Overall density (g/cm³) | | | | 0.021 | 0.022 | 0.021 | 0.021 | 0.018 | 0.014 | 0.020 |
| | | | Density (g/cm³) on inlet side | | | | 0.015 | 0.015 | 0.017 | 0.014 | 0.010 | 0.013 | 0.015 |
| | | | Density (g/cm³) on discharging side | | | | 0.027 | 0.029 | 0.025 | 0.027 | 0.026 | 0.014 | 0.025 |
| | | | Density ratio | | | | 1.800 | 1.933 | 1.471 | 1.929 | 2.600 | 1.077 | 1.667 |
| | | | Fiber orientation degree (°) in thickness direction | | | | 23 | 26 | 27 | 34 | 38 | 44 | 28 |
| | | | Water leakage test | | | Water leakage | water leakage did not occur | water leakage did not occur | water leakage did not occur | water leakage did not occur | water leakage did not occur | water leakage did not occur | water leakage did not occur |
| | | | | | | Water retention amount (g) | 6.3 | 6.0 | 5.8 | 6.7 | 8.5 | 10.3 | 7.3 |
| | | | | | | Pressure loss characteristics | good | good | good | good | good | good | good |
| | | | Thickness reduction (%) under load due to dust | | | | 93 | 93 | 93 | 93 | 94 | 91 | 95 |
| | | | Pressure loss (Pa) | | | | 22.0 | 23.0 | 22.6 | 20.3 | 19.6 | 22.6 | 31.4 |
| | | | Dust holding capactiy (g/0.1 m²) | | | | 103.6 | 94.4 | 91.6 | 122.3 | 138.0 | 197.9 | 103.0 |

TABLE 2

| | | | | | | | Comparative Example 1 | Comparative Example 2 | Comparative Example 3 | Comparative Example 4 | Comparative Example 5 |
|---|---|---|---|---|---|---|---|---|---|---|---|
| Amount of high melting point fiber (parts by mass) | Hollow actualized crimped fiber | PET | Melting point of 260° C. | Crimp degree of 20%, the number of crimps of 9/inch | Degree of hollowness of 27% | 6.6 dtex × 51 mm | — | — | 20 | — | — |
| | | | | Crimp degree of 22%, the number of crimps of 8/inch | | 14.4 dtex × 51 mm | — | — | — | — | — |

TABLE 2-continued

| | | | | | | Comparative Example 1 | Comparative Example 2 | Comparative Example 3 | Comparative Example 4 | Comparative Example 5 |
|---|---|---|---|---|---|---|---|---|---|---|
| | Hollow actualized crimped fiber (conjugate) | PET | Melting point of 260° C. | Crimp degree of 16%, the number of crimps of 8/inch | Degree of hollowness of 10% | 7.7 dtex × 51 mm | 20 | — | — | 100 | 100 |
| | Non-hollow fiber | PET | Melting point of 260° C. | Crimp degree of 25%, the number of crimps of 10/inch | Degree of hollowness of 0% | 6.6 dtex × 51 mm | | | | | |
| | | | | Crimp degree of 24%, the number of crimps of 8/inch | | 17 dtex × 51 mm | — | 20 | — | — | — |
| Amount of low melting point fiber (parts by mass) | First low melting point fiber | L-PET | Melting point of 110° C. | Tg60° C. | | 2.2 dtex × 51 mm | — | — | — | — | — |
| | | | | | | 4.4 dtex × 51 mm | 15 | 15 | 15 | — | — |
| | | | | | | 17 dtex × 51 mm | 65 | 65 | 65 | — | — |
| | Second low melting point fiber | L-PP | Melting point of 130° C. | Tg−20° C. | | 20 dtex × 64 mm | — | — | — | — | — |
| | Type of binder | | | | | | — | — | — | acrylic binder | acrylic binder |
| | Needle size | | | | | | 40 | 40 | — | 40 | 40 |
| | The number of needles (g/cm³) | | | | | | 20 | 20 | 0 | 20 | 20 |
| | Needle depth (mm) | | | | | | 1 | 1 | 0 | 0 | 0 |
| | Average fineness (dtex) | | | | | | 13.03 | 15.11 | 13.03 | 6.6 | 6.6 |
| | Fiber weight per unit area (g/m²) | | | | | | 150 | 150 | 150 | 100 | 100 |
| | Resin weight per unit area (g/m²) | | | | | | — | — | — | 50 | 75 |
| | Total weight per unit area (g/m²) | | | | | | 150 | 150 | 150 | 150 | 375 |
| | Apparent thickness (mm) | | | | | | 7.5 | 5.2 | 7.3 | 7.9 | 16.2 |
| | Overall density (g/cm³) | | | | | | 0.020 | 0.029 | 0.021 | 0.019 | 0.023 |
| | Density (g/cm³) on inlet side | | | | | | 0.015 | 0.020 | 0.021 | 0.019 | 0.023 |
| | Density (g/cm³) on discharging side | | | | | | 0.025 | 0.038 | 0.021 | 0.019 | 0.023 |
| | Density ratio | | | | | | 1.667 | 1.900 | 1.000 | 1.000 | 1.000 |
| | Fiber orientation degree (°) in thickness direction | | | | | | 19 | 16 | 11 | 17 | 15 |
| | Water leakage test | | | | | Water leakage | water leakage occured | water leakage occured | water leakage did not occur | water leakage did not occur | water leakage did not occur |
| | | | | | | Water retention amount (g) | — | — | 6.2 | 4.0 | 8.8 |
| | | | | | | Pressure loss characteristics | poor | poor | good | poor | poor |
| | Thickness reduction (%) under load due to dust | | | | | | 87 | 81 | 80 | 93 | 95 |
| | Pressure loss (Pa) | | | | | | 21.6 | 22.6 | 19.6 | 22.1 | 41.2 |
| | Dust holding capactiy (g/0.1 m²) | | | | | | 88.5 | 83.6 | 82.2 | 102.9 | 77.6 |

INDUSTRIAL APPLICABILITY

The pre-air-filter of the present invention can be used for an intake line of an internal combustion engine.

DESCRIPTION OF THE REFERENCE CHARACTERS

1 pre-air-filter
2 main-air-filter
3 frame member
4 filter member

The invention claimed is:

1. A pre-air-filter for an internal combustion engine, the pre-air-filter containing a nonwoven fabric comprising:

a first fiber having a melting point of not lower than 80° C. and not higher than 200° C., a second fiber having a melting point higher than the melting point of the first fiber by not less than 30° C., the second fiber being crimped, and having a hollow structure, entanglement of the first fiber and the second fiber by needle punching, and fusion of the first fiber and the second fiber by partly or entirely melting the first fiber, wherein the first fiber is a composite fiber comprising a combination of resins selected from the group consisting of polyethylene-polypropylene, polypropylene-modified polypropylene, polyethylene-polyester, polyester-modified polyester, and nylon-modified nylon, wherein the second fiber is formed of materials selected from the group consisting of polyester resins, polyamide resins, acrylic resins, polyolefin resins, polyvinyl alcohol-based resins, polyvinyl chloride-based resins, polyether resins, regenerated fibers, and semi-synthetic fibers, and wherein the second fiber has a degree of hollowness of not less than 5% and not greater than 60%.

2. The pre-air-filter according to claim 1, wherein the entanglement by needle punching is performed by inserting needles from only one side of a fiber web.

3. The pre-air-filter according to claim 1, wherein a fiber orientation degree in a thickness direction is not less than 20° and not greater than 50°.

4. A pre-air-filter for an internal combustion engine, the pre-air-filter comprising:

a first fiber having a melting point of not lower than 80° C. and not higher than 200° C., a second fiber having a melting point of higher than the melting point of the first fiber by not less than 30° C., the second fiber being crimped, and having a hollow structure, entanglement of the first fiber and the second fiber, fusion of the first fiber and the second fiber by partly or entirely melting the first fiber, and a fiber orientation degree in a thickness direction of not less than 20° and not greater than 50°, wherein the first fiber is a composite fiber comprising a combination of resins selected from the group consisting of polyethylene-polypropylene, polypropylene-modified polypropylene, polyethylene-polyester, polyester-modified polyester, and nylon-modified nylon, wherein the second fiber is formed of materials selected from the group consisting of polyester resins, polyamide resins, acrylic resins, polyolefin resins, polyvinyl alcohol-based resins, polyvinyl chloride-based resins, polyether resins, regenerated fibers, and semi-synthetic fibers, and wherein the second fiber has a degree of hollowness of not less than 5% and not greater than 60%.

5. The pre-air-filter according to claim 1, wherein a density of the pre-air-filter on an air-discharging-side section is not less than 1.05 times a density of the pre-air-filter on an air-inlet-side section.

6. The pre-air-filter according to claim 1, wherein the second fiber has a fineness of not less than 4 dtex and not greater than 40 dtex, the first fiber has a fineness of not less than 1 dtex and not greater than 40 dtex, and the first fiber is contained in an amount of not less than 20% and not greater than 90% by mass relative to a total of the first fiber and the second fiber.

7. The pre-air-filter according to claim 6, wherein a hollow crimped fiber having a fineness of not greater than 12 dtex is contained as the second fiber in a ratio of not less than 10% by mass relative to the entirety of the second fiber.

8. The pre-air-filter according to claim 1, wherein the first fiber is a mixed fiber of a fine fiber having a fineness of not less than 1 dtex and not greater than 10 dtex and a thick fiber having a fineness of greater than 10 dtex and not greater than 40 dtex, and the fine fiber is contained in a ratio of not less than 10% by mass relative to a total of the fine fiber and the thick fiber.

9. The pre-air-filter according to claim 1, wherein the first fiber comprises a rigid fiber having a glass transition temperature of not lower than 10° C. and a flexible fiber having a glass transition temperature of lower than 10° C.

10. The pre-air-filter according to claim 8, wherein the fine fiber is a rigid fiber having a glass transition temperature of not lower than 10° C., and the thick fiber comprises a rigid fiber having a glass transition temperature of not lower than 10° C. and a flexible fiber having a glass transition temperature of lower than 10° C.

11. The pre-air-filter according to claim 1, wherein the first fiber and the second fiber are made from a common resin.

12. The pre-air-filter according to claim 1, wherein an average fineness in the entirety of the nonwoven fabric is not less than 7 dtex and not greater than 20 dtex, and a weight per unit area in the entirety of the nonwoven fabric is not less than 50 g/m$^2$ and not greater than 250 g/m$^2$.

13. An air filter for an internal combustion engine, the air filter comprising:

a main-air-filter; and the pre-air-filter according to claim 1 which is installed at an air-inlet-side of the main-air-filter.

* * * * *